United States Patent [19]

Henderson et al.

[11] Patent Number: 4,837,848

[45] Date of Patent: Jun. 6, 1989

[54] APPARATUS FOR SELECTING A REFERENCE LINE FOR IMAGE DATA COMPRESSION

[75] Inventors: Alex E. Henderson, El Granada; Frederick L. Drain, So. San Francisco; Lawrence G. Roberts, Woodside, all of Calif.

[73] Assignee: NetExpress Systems, Inc., San Mateo, Calif.

[21] Appl. No.: 32,102

[22] Filed: Mar. 27, 1987

[51] Int. Cl.$^4$ ............................................. G06K 9/36
[52] U.S. Cl. ....................................... 382/56; 358/260
[58] Field of Search ................... 382/56, 34; 358/133, 358/135, 136, 260

[56] References Cited

U.S. PATENT DOCUMENTS

| | | | |
|---|---|---|---|
| 4,204,232 | 5/1980 | Mizuno | 382/56 |
| 4,288,782 | 9/1981 | Bader et al. | 382/34 |
| 4,439,840 | 3/1984 | Coleman et al. | 382/34 |
| 4,513,440 | 4/1985 | Delman | 382/34 |
| 4,566,128 | 1/1986 | Arati | 382/56 |
| 4,630,306 | 12/1986 | West et al. | 382/56 |
| 4,651,341 | 3/1987 | Nakashima et al. | 382/34 |
| 4,654,719 | 3/1987 | Tomita | 358/136 |

OTHER PUBLICATIONS

"Standardization of Group 3 Facsimile Apparatus for Document Transmission," CCITT Recommendation T.4, (Geneva, 1980).

Primary Examiner—Leo H. Boudreau
Assistant Examiner—Joseph Mancuso
Attorney, Agent, or Firm—Townsend and Townsend

[57] ABSTRACT

An apparatus for selecting a reference line for image data compression including a plurality of mutually connected reference selector chips for selecting a reference scan line from vertical mode coding of image data. The reference selector chips select a reference scan line from a plurality of preceding scan lines in exclusive or combination of the image data of each candidate reference scan line with the image data from the input scan line. The candidate reference scan line that has the lowest number of dissimilar bits is selected as the reference scan line. Each candidate reference scan line has associated therewith a register having bit positions arranged from the highest order bit position to a lowest order bit position for storing a binary sum of the number of dissimilar bits. When the sums are compared, the binary value and successive bit positions are compared from the highest order bit position to the lowest order bit position. When the binary value for a compared bit position of a register is greater than the binary value in the corresponding bit position of another register, each reference selector chip generates a losing signal for indicating that the register lost the arbitration. When the lowest order bit position of a register is not greater than the lowest order bit position of any other register and no losing signal was generated for the register, the associated chip generates a winning signal for indicating which candidate reference scan line had the least number of bits dissimilar to the corresponding bits in the input scan line. Each chip further includes a circuit for establishing a priority among the candidate reference scan lines so that two registers both having the smallest binary sum will not create a deadlock.

24 Claims, 12 Drawing Sheets

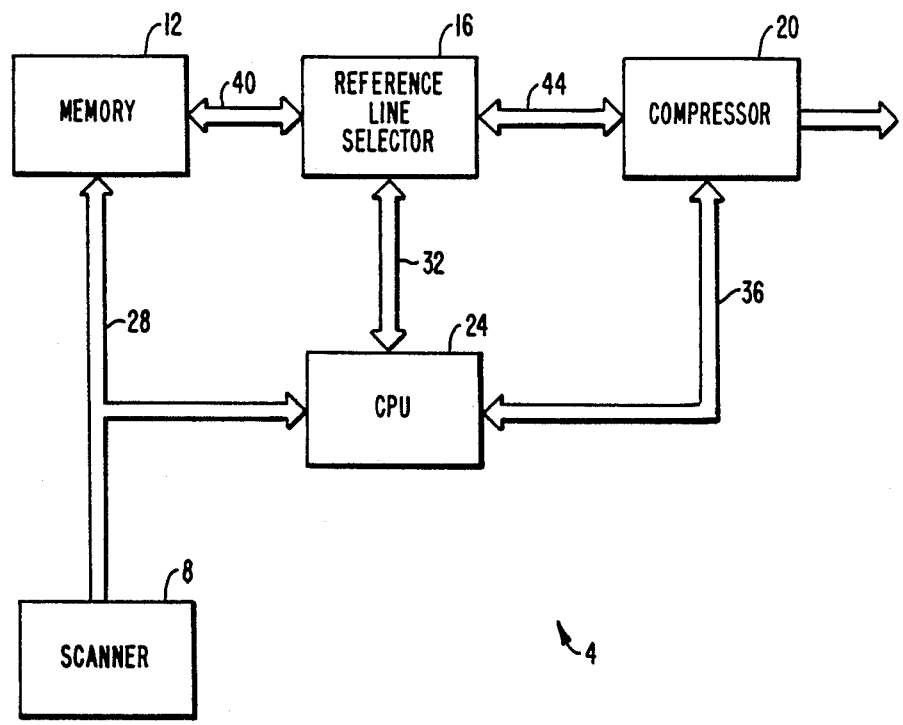
FIG._1.

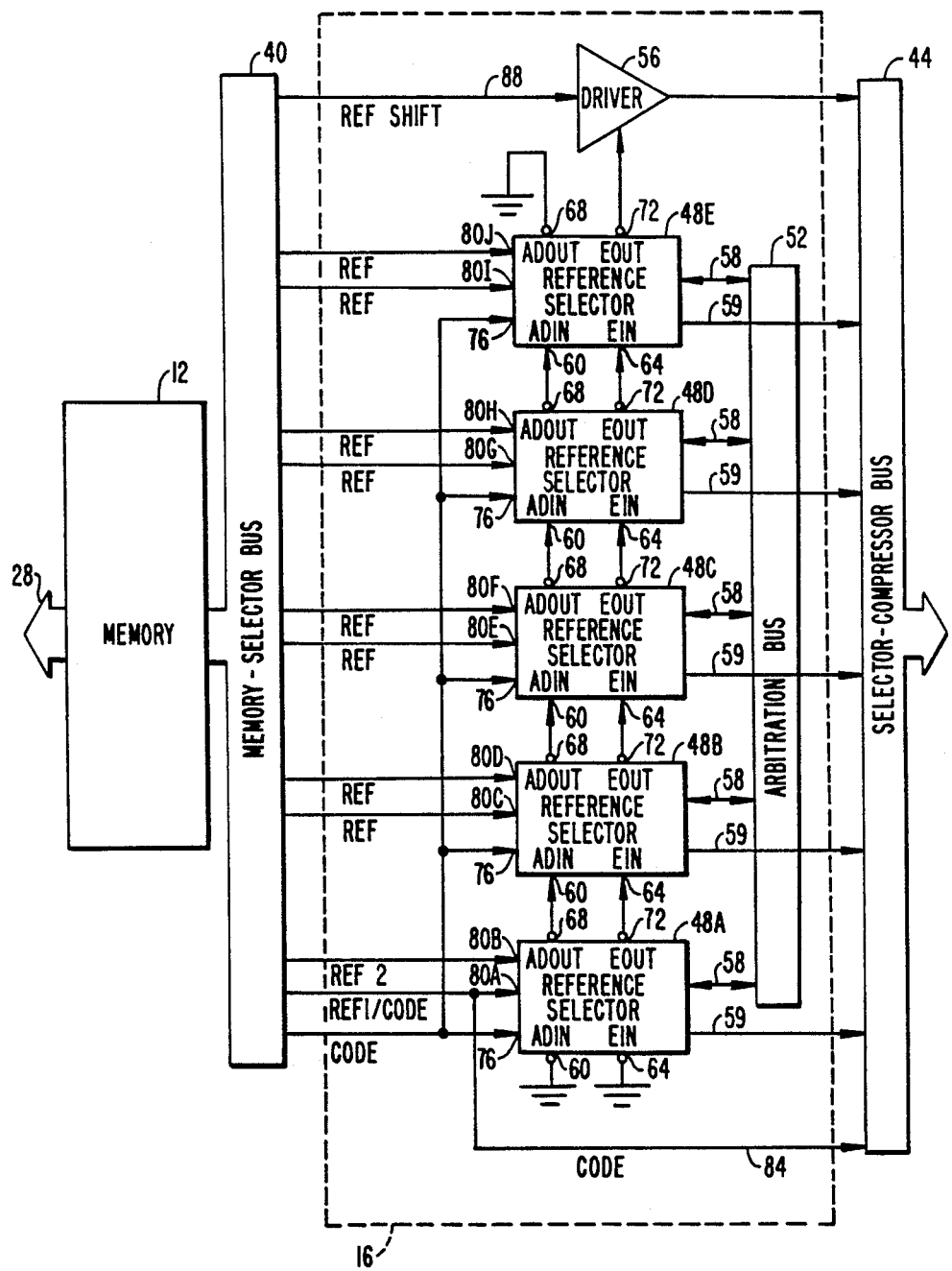
FIG._2.

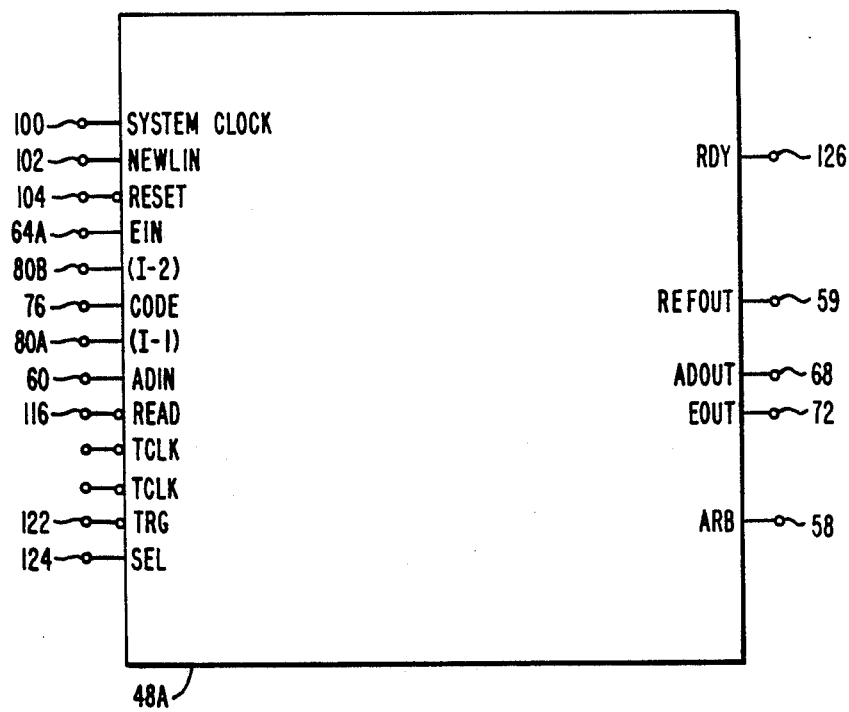
FIG._3.
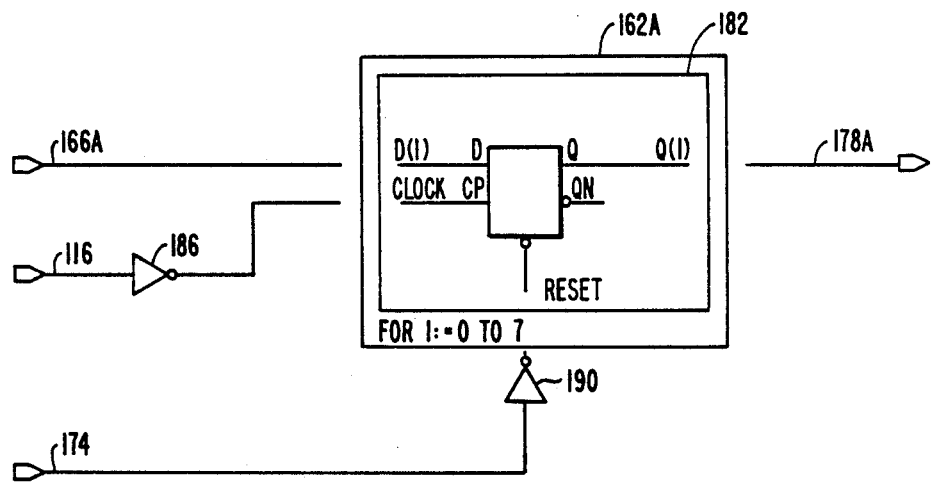
FIG._5.

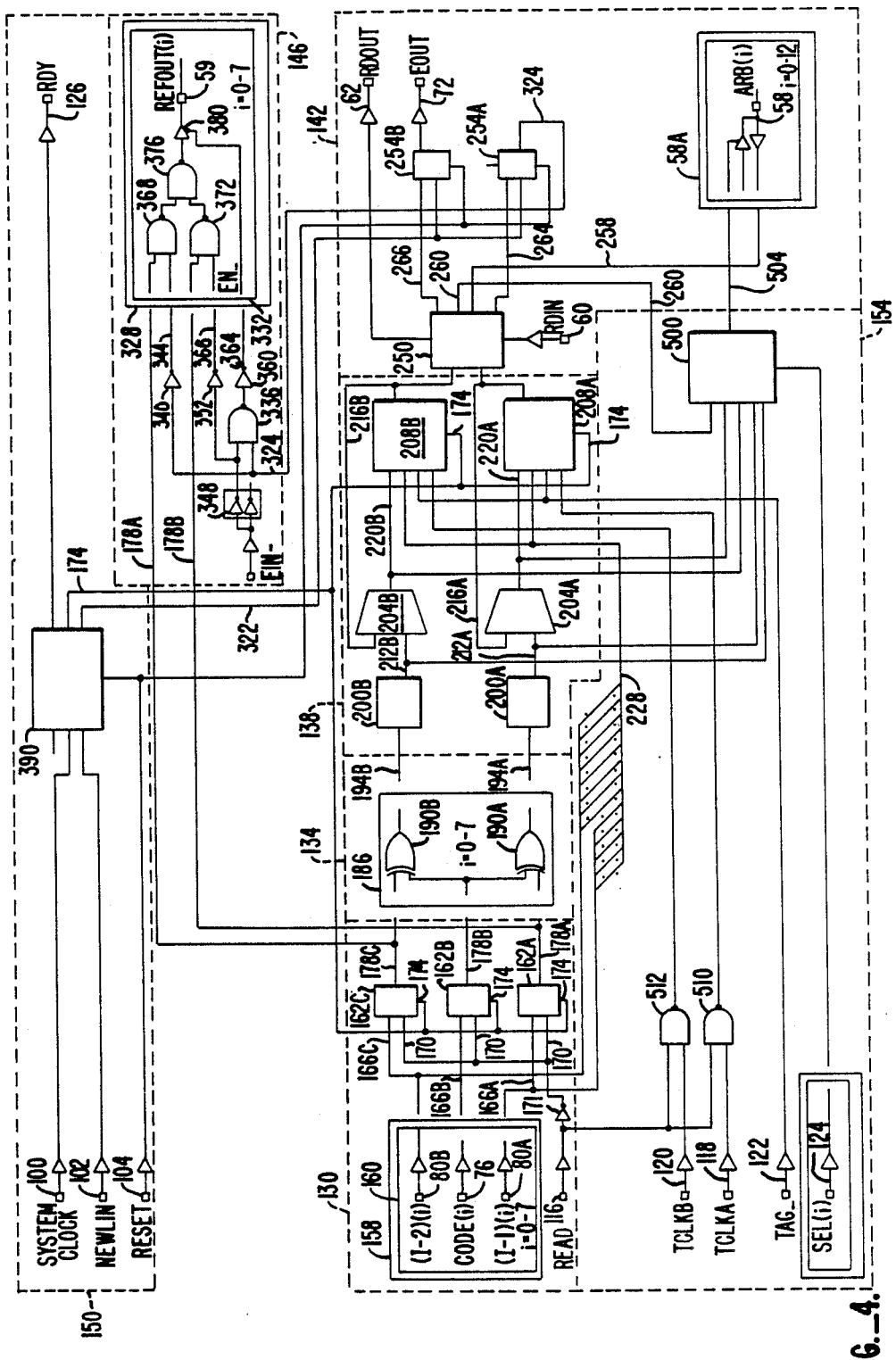
FIG._4.

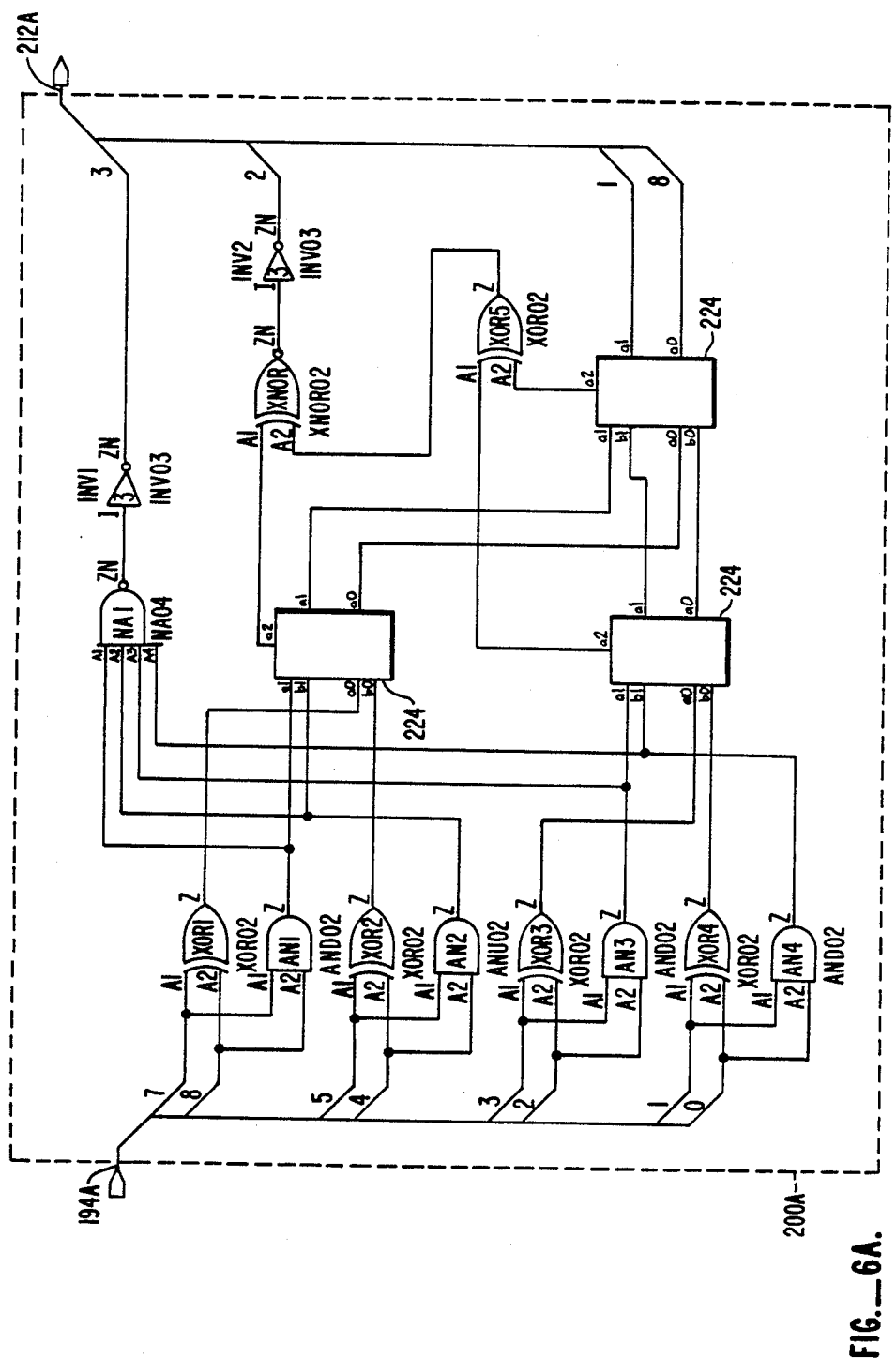
FIG._6A.

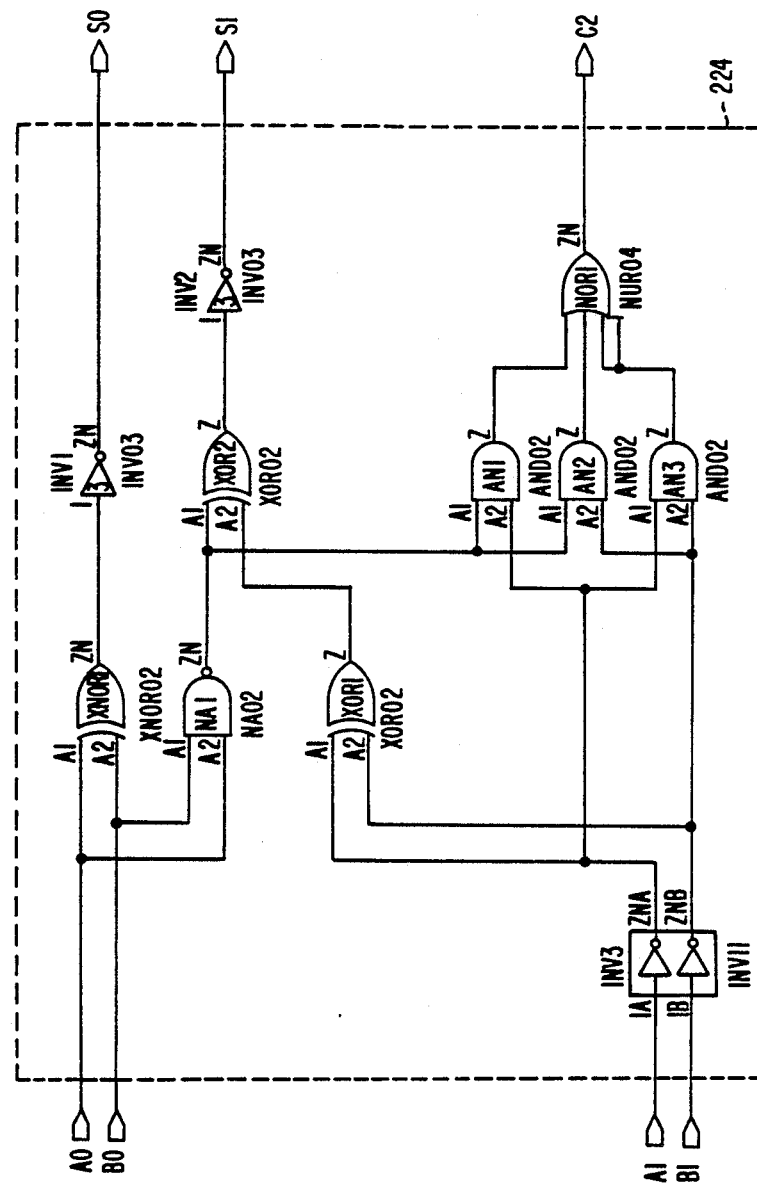
FIG.—6B.

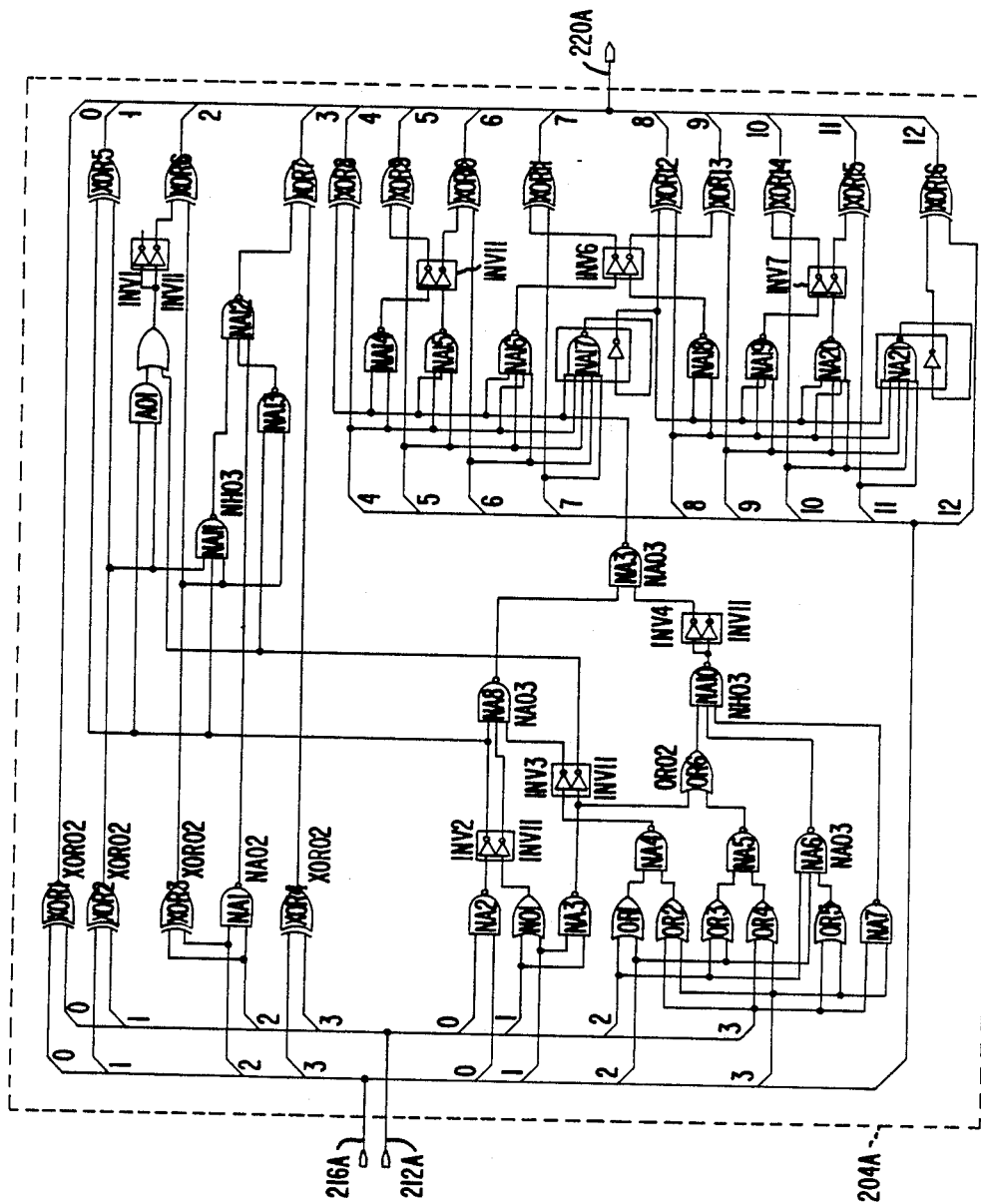
FIG._7.

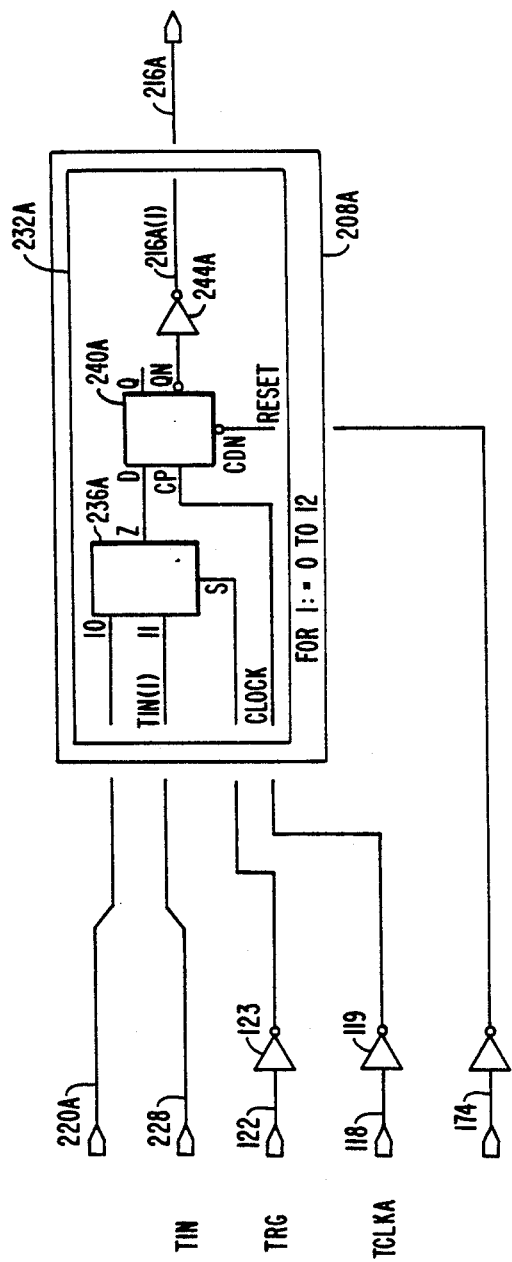
FIG._8.

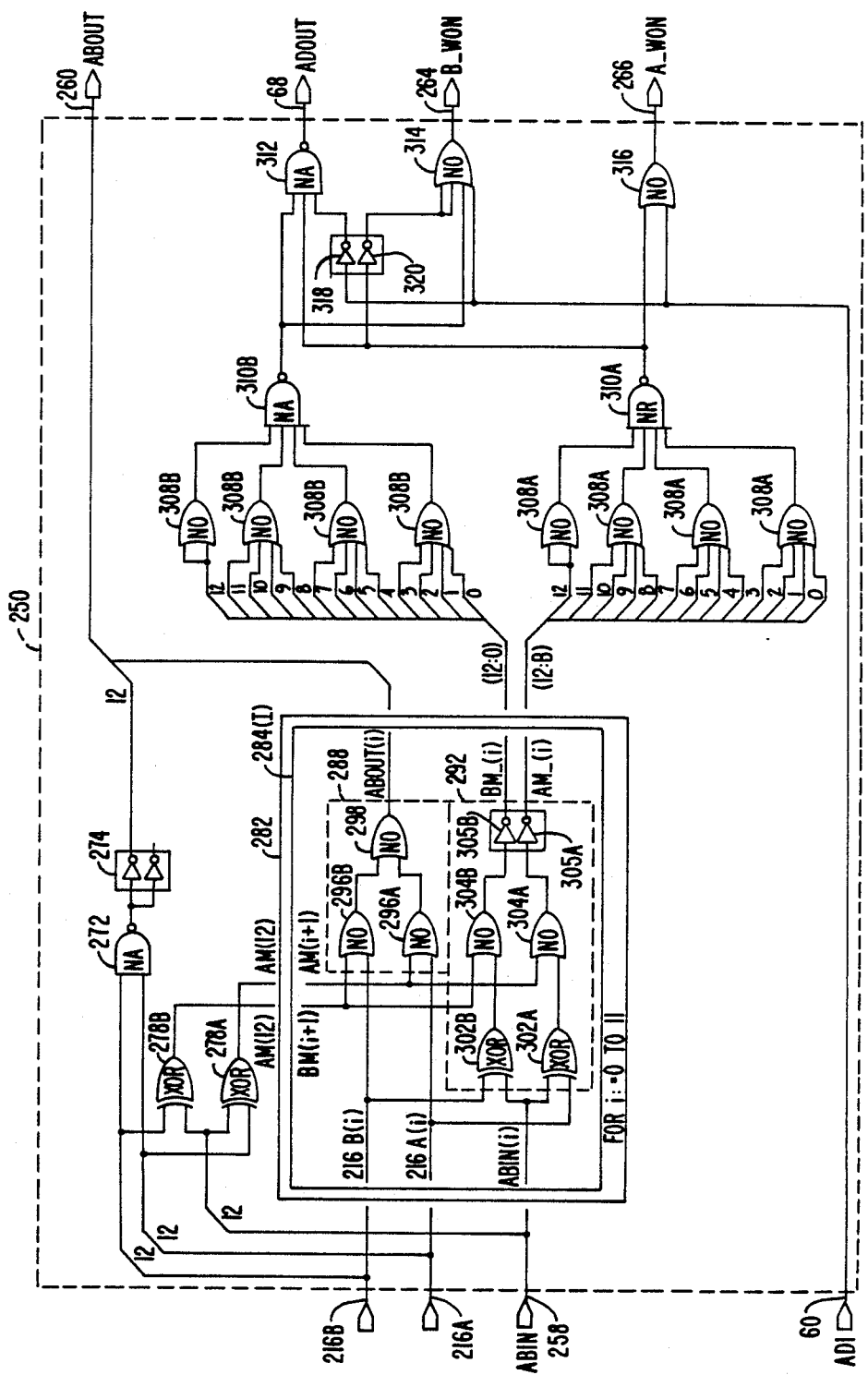
FIG._9.

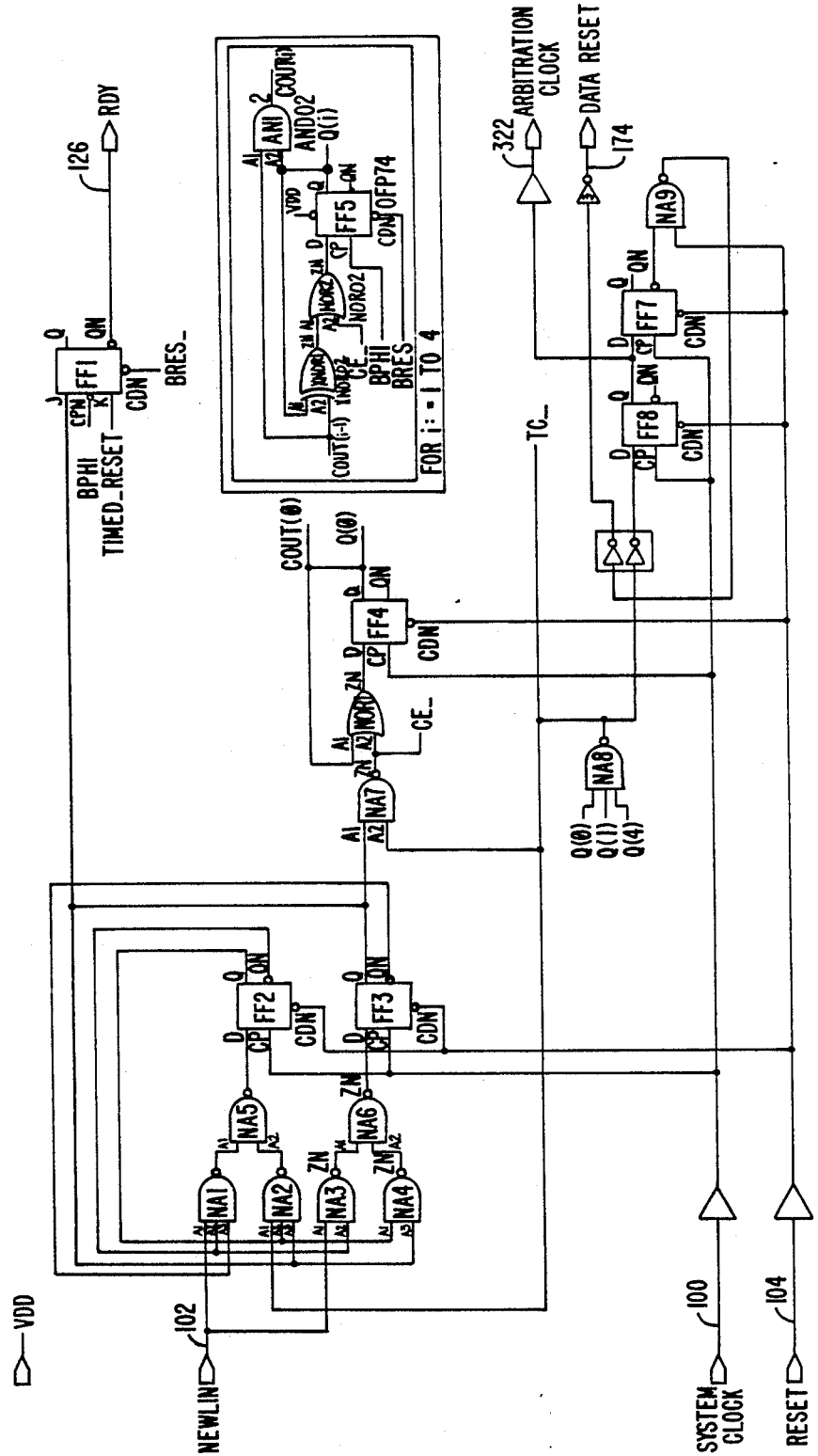
FIG._10.

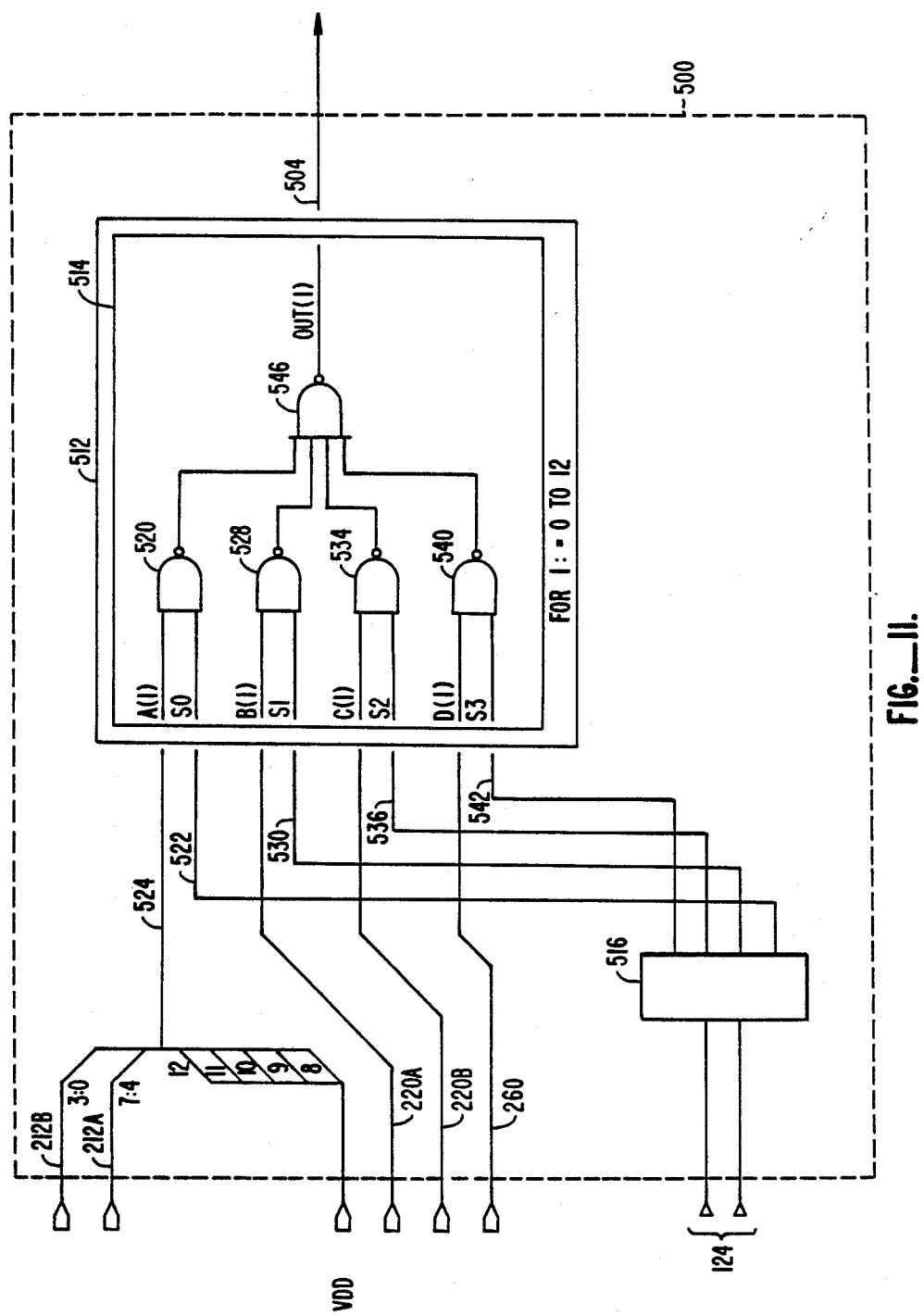

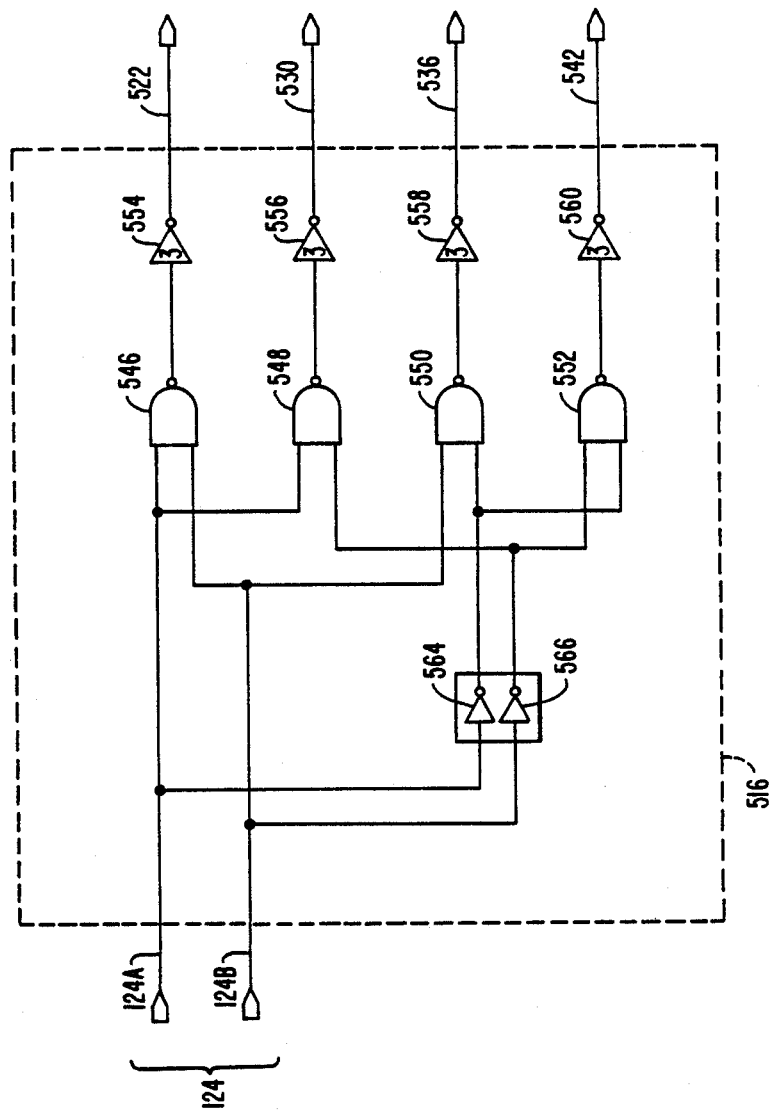
FIG._12.

APPARATUS FOR SELECTING A REFERENCE LINE FOR IMAGE DATA COMPRESSION

BACKGROUND OF THE INVENTION

This invention relates to image data compression for telecommunication of a facsimile of a two-dimensional image and more particularly, to an apparatus for selecting a reference line for vertical mode coding of image data.

Equipment for telecommunication of images include a transmitter at one location for encoding an image, a communication link for communicating the encoded image data, and a receiver at another location for decoding the encoded image data. Typically, the major cost of facsimile transmission is the cost of transmitting the image data over the communication link, such as a telephone line. Preferably, the image data is compressed prior to transmission to reduce the number of bits of image data to be transmitted and thereby reduce the operating cost of the communication link.

A known method for compressing image data is to encode the image data using a vertical mode coding technique described in "Standardization Of Group 3 Facsimile Apparatus For Document Transmission". CCITT Recommendation T.4 (Geneva, 1980) which is incorporated herein by reference. Vertical mode coding techniques require a reference scan line for each scan line of the image to be encoded for transmission. The reference scan line is used so that the current scan line to be coded can be represented by coding only the changes or differences between the current scan line and the reference scan line.

Invariably, the CCITT facsimile data compression coding algorithms use the scan line immediately preceding the current scan line as the reference scan line. However, since the differences between the current scan line to be coded and the immediately preceding scan line can be great, the amount of image data transmitted over the communication link can be substantial. This often frustrates the purpose of image data compression.

SUMMARY OF THE INVENTION

The present invention contemplates the use of a plurality of mutually connected reference selector chips for selecting a reference scan line for vertical mode coding of image data. The reference selector chips contribute to improved image data compression so that the cost of using the communication link is reduced.

In one embodiment of the present invention, the plurality of reference selector chips select a reference scan line from a plurality of scan lines preceding the input scan line by estimating the data compression which results from encoding the input scan line with each candidate reference scan line. In particular, each bit in each candidate reference scan line that does not match a corresponding bit in the input scan line is counted. This is preferably performed by an exclusive-OR combination of the image data for each candidate reference scan line with image data for the input scan line. The candidate reference scan line that has the lowest number of dissimilar bits is selected as the reference scan line.

To determine which candidate reference scan line has the lowest number of dissimilar bits to the input scan line, each candidate reference scan line has associated therewith a register having bit positions arranged from a highest order bit position to a lowest order bit position for storing a binary sum of the number of dissimilar bits. When the sums are compared, the binary value in successive bit positions are compared from the highest order bit position to the lowest order bit position. When the binary value on a compared bit position of a register is greater than the binary value in the corresponding bit position of another register, each reference selector chip generates a losing signal for indicating that that register lost the arbitration. When the lowest order bit position of a register is not greater than the lowest order bit position of any other register and no losing signal was generated for that register, the associated chip generates a winning signal for indicating which candidate reference scan line had the least number of bits dissimilar to the corresponding bits in the input scan line.

Each chip further includes a circuit for establishing a priority among the candidate reference scan lines so that two registers both having the smallest binary sum will not create a deadlock. A winning signal will thus be generated only when the register having the smallest binary value also corresponds to the highest priority candidate reference scan line.

The above and other features of the invention and the concomitant advantages will be better understood and appreciated by those skilled in the art in view of the following detailed description taken in conjunction with the accompanying drawings.

BRIEF DESCRIPTION OF THE DRAWINGS

FIG. 1 is a blocked diagram of an embodiment of a reference line selection apparatus in accordance with the invention;

FIG. 2 is a blocked diagram of the reference line selector depicted in FIG. 1;

FIG. 3 is a schematic representation of a reference selector chip depicted in FIG. 2;

FIG. 4 is a schematic representation of the reference selector chip depicted in FIG. 3;

FIG. 5 is a schematic representation of an input register depicted in FIG. 4;

FIGS. 6a and 6b are a schematic representation of a comparison counter depicted in FIG. 4;

FIG. 7 is a schematic representation of a 13-bit depicted in FIG. 4;

FIG. 8 is a schematic representation of a 13-bit register depicted in FIG. 4;

FIG. 9 is a schematic representation of the arbitrated depicted in FIG. 4;

FIG. 10 is a schematic representation of the line control circuit depicted in FIG. 4; and FIGS. 11 and 12 are a schematic representation of the test circuit depicted in FIG. 4.

DETAILED DESCRIPTION OF THE PREFERRED EMBODIMENT

Overview

FIG. 1 is a block diagram of one embodiment of a reference scan line selecting apparatus in accordance with the invention generally designated by the numeral 4. Reference scan line selecting apparatus 4 includes a scanner 8 for scanning the image to be coded, a memory 12 for storing a plurality of candidate reference scan lines and the input scan lines to be coded (hereinafter referred to as coding lines), a reference line selector 16 for selecting the candidate reference scan line having the least number of bits unequal to corresponding bits in the coding line, a compressor 20 for encoding the coding line with the reference scan line, preferably using vertical mode coding as discussed in the Background of The Invention, and a CPU 24 for controlling operation of the system.

CPU 24 may communicate with memory 12, reference line selector 16 and a compressor 20 through a CPU-memory bus 28, a CPU-selector bus 32 and a CPU-compressor bus 36 respectively. Memory 12 communicates with reference line selector 16 through a memory-selector bus 40, and reference line selector 16 communicates with compressor 20 through a selector-compressor bus 44.

Scanner 8 may communicate with CPU 24 and memory 12 through CPU-memory bus 28. Preferably, scanner 8 is a component of the Canon laser copier system (Part No. SSF-J76O5) manufactured by Canon, Incorporated of Japan. Scanner 8 converts the scanned image into a series of image scan lines, each image scan line in turn being represented by a series of bits. Memory 12 stores the series of image scan lines as coding lines to be serially communicated to compressor 20 via reference line selector 16. In this system, the series of image scan lines stored in memory 12 also serves as the candidate reference scan lines, because the plurality of candidate reference scan lines comprise the 10 image scan lines preceding the coding line currently being processed by reference line selector 16. Memory 12, compressor 20, and CPU 24 are known elements and do not form a part of the present invention, so details of their construction shall be omitted.

As shown in FIG. 2, reference line selector 16 comprises a plurality e.g., five reference selector chips 48A–48E, an arbitration bus 52, and a driver 56. For overview purposes, only the connections necessary to understand the general operation of reference line selector 16 are shown. Other control and data lines have been omitted and shall be discussed later.

Each reference selector chip 48A–48E has the same construction. As shown in FIG. 2 each reference selector chip 48A–48E has an arbitration line (ARB) 58 for placing signals onto and receiving signals from arbitration bus 52 and a reference output (REFOUT) line 59 for communicating the selected reference scan line to selector compressor bus 44 and thereafter to compressor 20. Each reference selector chip further includes an arbitration disable input (ADIN) 60, an enable input (EIN) 64, an arbitration disable output (ADOUT) 68, and an enable output (EOUT) 72. Each ADOUT 68 is connected to the corresponding ADIN 60 in the adjacent reference selector chip, and each EOUT 72 is connected to the corresponding EIN 64 in the adjacent reference selector chip, ADIN 60 and EIN 64 of reference selector chip 48A and ADOUT pin 68 of reference selector chip 48E are connected to a ground potential. The EOUT 72 of reference selector chip 48E is connected to driver 56. The reason for this configuration shall be discussed in more detail below.

Each reference selector chip 48A–48E has a coding line input 76 for receiving the next input scan line to be coded and two reference line inputs 80A and 80B, 80C and 80D, 80E and 80F, 80G and 80H, and 80I and 80J, respectively. Reference line inputs 80A–80J provide candidate reference scan lines to reference line selector 16.

In operation the Ith coding line for I=one, two three ... is input one byte at a time to coding line input 76 of each reference selector chip 48A–48E. Simultaneously, the ten scan lines preceding the coding line in the image scan line series (i.e. I−1, I−2 ... I−10) which constitute the candidate reference scan lines are input to reference line inputs 80A–80J, respectively. Each reference selector chip 48A–48E compares the Ith coding line with its respective input candidate reference scan line pair and determines the number of bits in each candidate reference scan line which differ from corresponding bits in the coding line. The determination is based upon an exclusive-OR combination of bits in the coding line with corresponding bits in each candidate reference scan line in the candidate reference scan line pair. The two sums which result are then compared, through arbitration bus 52, with the sums determined by the other reference selector chips to determine which candidate reference scan line in which reference selector chip produced the least number of differences. After the candidate reference scan line having the least number of bits dissimilar to the coding line is determined, each candidate reference scan line is shifted up one line by memory 12 (i.e.. the (I−1)th scan line becomes the (I−2)th scan line), and the coding line just processed is input to candidate reference scan line input 80A for becoming the new (I−1)th candidate reference scan line. The (I+1)th coding line is then input to each coding line input 76.

For efficient operation, the Ith coding line is output while the (I+1)th coding line is being processed. Since the Ith coding line is being input as the (I−1)th scan line to reference line input 80A while the (I+1)th line is being input to the coding line inputs 76, reference line input 80A is connected to a coding line output line 84 for communicating the Ith coding line to selector-compressor bus 44 and thereafter to compressor 20. At the same time, the selected reference scan line is also communicated to selector-compressor bus 44 and thereafter to compressor 20.

It is possible that the selected candidate reference scan line for the Ith coding line was input to one of the upper reference line inputs 80B, 80D, 80F, 80H or 80J of reference selector chips 48A–48E respectively. When this occurs, the selected reference scan line will be shifted up and input to the lower reference line input in the adjacent chip when processing the (I+1)th coding line. Consequently, the adjacent reference selector chip must be instructed to output the selected reference scan line while processing the (I+1)th coding line. This is accomplished by EOUT 72 and EIN 64 in each reference selector chip 48A–48E. To take an example wherein the selected reference line is shifted from reference line input 80B in reference selector chip 48A to reference line input 80C in reference selector chip 48B, a signal is output on EOUT 72 of reference selector chip 48A and input to EIN 64 of reference selector chip 48B. This signal instructs reference selector chip 48B to output as the selected reference scan line the candidate reference scan line being input to reference line input 80C. Since reference selector chip 48A has no preceding reference selector chip EIN 64 of reference selector chip 48A is connected to a ground potential.

It is also possible that the selected reference scan line for the Ith line to be coded was input to reference line input 80J of reference selector chip 48E during the selection process. That is, the selected reference scan line was the (I−10)th scan line. In this case it is necessary to provide a special overflow shift line 88 to input the former (I−10)th scan line to driver 56 so that driver 56 may output the selected reference scan line to selector-compressor bus 44 upon receipt of the proper signal from EOUT 72 of reference selector chip 48E.

As discussed above, the reference scan line is selected by performing an exclusive-OR combination of successive bits in the Ith coding line with corresponding bits in each candidate reference scan line in order to ascertain the similarity between the coding line and each candidate reference scan line. The number of dissimilar bits is counted, and the reference scan line having the least number of dissimilar bits is selected as the reference scan line. Since there are five reference selector chips performing the comparisons, it is necessary for the chips to communicate and arbitrate among themselves to determine which chip contains the selected reference scan line.

Arbitration is accomplished by using arbitration bus 52. Arbitration bus 52 is a 13-bit bus which utilizes pullup resistors to facilitate implementation of open collector wire-ORing. Therefore, a particular wire on the bus will remain high unless actively driven low, so if no reference selector chip drives the bus low, each chip will detect a high input on its associated arbitration line 58.

In this embodiment, each reference selector chip 48A-48E includes a pair of 13-bit registers, one for each input candidate reference scan line. The registers contain the count of dissimilar bits for their associated candidate reference scan line. Arbitration is a serial process wherein corresponding bits in each register are compared using ARBITRATION BUS 52 beginning at the highest order bit position and proceeding toward the lowest order bit position to determine which register contains the smallest value. The process may be understood by referring to Table 1.

TABLE 1

| CANDIDATE | CHIP | BIT POSITION | | | | | | | | | | | | |
|---|---|---|---|---|---|---|---|---|---|---|---|---|---|---|
| | | 12 | 11 | 10 | 9 | 8 | 7 | 6 | 5 | 4 | 3 | 2 | 1 | 0 |
| (I-10) | 48E | 1 | * | * | * | * | * | * | * | * | * | * | * | * |
| (I-9) | 48E | 0 | 1 | 1 | 0 | 0 | 0 | 1 | 0 | 0 | 1 | 0 | 1 | 1 |
| (I-8) | 48D | 0 | 1 | 1 | 1 | * | * | * | * | * | * | * | * | * |
| (I-7) | 48D | 1 | * | * | * | * | * | * | * | * | * | * | * | * |
| (I-6) | 48C | 1 | * | * | * | * | * | * | * | * | * | * | * | * |
| (I-5) | 48C | 0 | 1 | 1 | 0 | 0 | 0 | 1 | 0 | 0 | 1 | 0 | 1 | 1 |
| (I-4) | 48B | 1 | * | * | * | * | * | * | * | * | * | * | * | * |
| (I-3) | 48B | 1 | * | * | * | * | * | * | * | * | * | * | * | * |
| (I-2) | 48A | 1 | * | * | * | * | * | * | * | * | * | * | * | * |
| (I-1) | 48A | 0 | 1 | 1 | 1 | * | * | * | * | * | * | * | * | * |

Table 1 lists bit position values for the count of dissimilar bits for each candidate reference scan line. Each chip first compares bit 12 of its registers with bit 12 on the arbitration bus. In this example, the registers corresponding to candidate reference scan lines I−1, I−5, I−8 and I−9 have a zero in this position. Accordingly, bit 12 of arbitration bus 52 will be driven low by chips 48A, C, D and E. When each chip detects a low signal on bit 12 of its arbitration line 58, it knows that there exists a register somewhere which has a value lower than any register which has a one in this position.

Since only one bit is checked at a time, it is necessary to disable the losing registers from the arbitration process the moment it is determined that a lower value exists. Otherwise, a zero in one of the subsequent bit positions of a losing register may mislead the other reference selector chips into a false value comparison (since a winning register may have a one in the same position). As a result, the registers for candidate reference scan lines I−2, I−3, I−4, I−6, I−7 and I−10 will be disabled from the arbitration process. This is indicated by asterisks in the remaining bit positions of those registers.

Next, the reference selector chips 48A, C. D and E will compare bit 11 of the registers for candidate reference scan lines I−1, I−5, I−8 and I−9 with bit 11 on arbitration bus 52. Since all registers participating in the arbitration process have a "1" in this position arbitration bus 52 will not be driven low and hence each register will continue the arbitration process. Bit 10 of the participating registers and bit 10 of arbitration bus 52 are then inspected. Again, since none of the registers participating in the arbitration process has a zero in this bit position, arbitration bus 52 remains high and the arbitration process continues.

When bit 9 of the participating registers is inspected bit 9 of arbitration bus 52 will be driven low by the occurrence of the zero in the registers for reference lines I−5 and I−9. Consequently, the registers for reference lines I−1 and I−8 drop out of the arbitration process. The arbitration process continues between the registers for reference lines I−5 and I−9 for bits eight through one since these registers either both contain ones or both contain zeros in their respective bit positions. When bit zero is inspected, both participating registers contain a "1", so reference line I−5 and reference line I−9 both have the least number of dissimilar bits relative to the coding line.

To avoid a potential deadlock, each "winning" chip inspecting bit zero communicates a signal on its ADOUT 68 which is received by the adjacent chip on its ADIN 60. A chip receiving this signal on its ADIN 60 is disabled from the arbitration process. Thus, ADIN 60 and ADOUT 68 function to establish a priority among the chips with the lower chips having the higher priority. The signal is communicated up through all successive chips so that only the lowest chip driving the chain will not be disabled. Since reference selector chip 48A cannot be disabled by any lower chip, its ADIN 60 is connected to a ground potential. Similarly, since reference selector chip 48E cannot disable any higher chip, its ADOUT 68 is also connected to a ground potential. As a result, the lowest chip in the chain which also contains the lowest value in one of its registers (chip 48C in the above example) controls output of the selected reference line during the succeeding reference selection cycle.

The details of construction and operation of each reference selector chip 48A–48E shall now be discussed. Since each reference selector chip 48A–48E is constructed the same, only reference selector chip 48A shall be described.

Reference Selector Chip

FIG. 3 is a diagram of reference selector chip 48A illustrating the inputs to and outputs from the chip.

Reference selector chip 48A has a system clock input 100 for timing events within the chip, a new line input (NEWLIN) 102 for indicating to the chip that a new line of image data is to be processed, and a reset input 104 for resetting the chip logic. These inputs preferably are programmed to be generated by CPU 24 and function to initiate arbitration. Reference selector chip 48A also includes enable input (EIN) 64, candidate reference scan line (I−1) input 80A, coding line input (CODE) 76, candidate reference scan line (I−2) input 80B, arbitration disable input (ADIN) 60, and a read input 116 for instructing reference selector chip 48A to read the next byte of the reference and coding lines. Read input 116 preferably comes from CPU 24.

The next four signals are provided for testing purposes and are not normally active during normal operation. Therefore, TCLKA input 118, TCLKB input 120, TRG input 122 and SEL input 124 shall be discussed later.

A ready signal 126 informs CPU 24 that arbitration to select the reference scan line has been completed and that the chip is ready for a new line, and reference output (REFOUT) line 59 communicates the selected reference line to selector-compressor bus 44. Finally, reference selector chip 48A includes arbitration disable output (ADOUT) 68, enable output (EOUT) 72, and arbitration line (ARB) 58.

FIG. 4 is a more detailed diagram of the construction of reference selector chip 48A. As shown in FIG. 4, reference selector chip 48A includes an input circuit 130 for receiving candidate reference scan line and coding line input data. Input circuit 130 is connected to a reference comparison circuit 134 for exclusive-ORing respective bits of the coding line with the candidate reference scan lines, and a summation circuit 138 is for summing the number of dissimilar bits between each candidate reference scan line and the coding line. An arbitration circuit 142 is for determining which of the two candidate reference scan lines input to this chip has the least number of dissimilar bits relative to the coding line and for determining which chip contains the selected reference scan line. A reference line output circuit 146 is for communicating the selected reference line (if resident within this chip) onto selector-compressor bus 44.

A line control circuit 150 is for controlling the operation of reference selector chip 48A for each set of image data lines, and a test circuit 154 is for aiding the applications designer when testing the chip.

Input Circuit

As shown in FIG. 4 input circuit 130 comprises an image data input interface 158 and input registers 162A, 162B and 162C. Image data input interface 158 comprises eight image data input sections 160, each having one candidate reference scan line (I−1) input 80A, one coding line input 76, and one candidate reference scan line (I−2) input 80B. Thus, there are actually eight candidate reference scan line (I−1) inputs 80A, eight coding line inputs 76 and eight candidate reference scan line (I−2) inputs 80B. Input registers 162A, 162B and 162C are connected to candidate reference scan line (I−2) inputs 80A, coding line inputs 76, and candidate reference scan line (I−1) inputs 80B through data input lines 166A, 166B and 166C, respectively. Each data input line 166A, 166B and 166C comprises an 8-bit line for receiving information in byte parallel format from image data interface 158. Each input register 162A, 162B and 162C is further connected to a data clock line 170 which is connected to read input 116 through an inverter 171, a data reset line 174, and data latch lines 178A, 178B and 178C, respectively.

FIG. 5 illustrates the structure of each input register 162A, 162B and 162C. Since the construction of each register is the same, only the structure of input register 162A is shown.

Input register 162A comprises a series of eight input flip flops 182. Each flip flop 182 comprises a standard D-type flip flop of well-known construction. The data input D(I) of each input flip flop 182 is connected to a respective data input line 166A. The clock input of each input flip flop 182 is connected to data clock line 170 through an inverter 186, and the reset input is connected to reset line 174 through an inverter 190. The Q (I) output of each input flip flop 182 is connected to a respective data latch line 178A.

Reference Comparison Circuit

As shown in FIG. 4, reference comparison circuit 134 comprises eight bit-comparator circuits 186, one for each of the eight lines comprising data latch lines 178A, 178B and 178C. Each bit-comparator circuit 186 comprises a pair of exclusive-OR gates 190A and 190B for receiving inputs from the data latch lines 178A, 178B and 178C. Reference comparison circuit 134 operates on the input data by exclusive-ORing the bits of each candidate reference scan line with corresponding bits in the coding line. Data latch line 178B, which inputs the coding line, is connected to both exclusive-Or gates 190A and 190B. Data latch line 178A, which inputs candidate reference scan line (I−1), is connected to exclusive-OR gate 190A. Data latch line 178C, which inputs the candidate reference scan line (I−2), is connected to exclusive-OR gate 190B.

Reference comparison circuit 134 is connected to summation circuit 138 through comparison output lines 194A and 194B. Each comparison output line 194A and 194B comprises eight data lines corresponding to the eight outputs of exclusive OR gates 190A and 190B, respectively.

Summation Circuit

As shown in FIG. 4, summation circuit 138 comprises a comparison counter 200A, a 13-bit adder 204A, and a 13-bit register 208A for summing the number of ones appearing on the eight data lines of comparison output 194A, and a comparison counter 200B, a 13-bit adder 204B, and a 13-bit register 208B for counting the number of ones appearing on the eight data lines of comparison output line 194B.

Comparison counter 200A receives as input the comparison output line 194A from reference comparison circuit 134 and produces as output a 4-bit sum line 212A. The signals appearing on 4-bit sum line 212A are representative of the number of ones appearing on comparison output line 194A. Four-bit sum line 212A is input to 13-bit adder 204A which also has as input a 13-bit total line 216A from 13-bit register 208A. The purpose of 13-bit adder 204A is to add the value appearing on 4-bit sum line 212A to the 13-bit value appearing on 13-bit total line 216A and output the result on 13-bit sum line 220A. Thus, the value appearing on 13-bit sum line 220A (and on 13-bit total line 216A) is a running total of the number of bits of candidate reference scan line (I−1) which are dissimilar to corresponding bits in the coding line. At the end of the summation process, 13-bit total line 216A will contain the total number of dissimilar bits between the two compared lines.

Comparison counter 200B, 13-Bit adder 204B, and 13-Bit register 208B operate the same way.

Comparison Counter

The purpose and operation of comparison counters 200A and 200B are to sum the number of ones appearing on each of the eight data lines of comparison output line 194A and 194B, respectively, and to pass the respective sums to 13-bit adders 204A and 204B, respectively.

FIGS. 6A and 6B are schematic circuit drawings for the comparison counter 200A preferably included in reference selector chip 48A. Since comparison counter 200B is constructed the same way, details of that counter shall be omitted. Although FIGS. 6A and 6B show a preferred circuit implementation for comparison counter 200A, the specific circuit implementation can take any of various forms for effecting the operation of counting the number of one-bits appearing on comparison output line 194A.

13-Bit Adder

The purpose and operation of 13-bit adders 204A and 204B are to sum the binary values appearing on 4-bit sum lines 212A and 212B respectively, with the corresponding binary values appearing on 13-bit total lines 216A and 216B and to communicate the resulting 13-bit sum through 13-bit sum lines 220A and 220B to 13-bit registers 208A and 208B, respectively.

FIG. 7 is a schematic circuit drawing for 13-bit adder 204A preferably included in reference selector chip 48A. Since 13-bit adder 204B is constructed the same way, details of that adder shall be omitted. Although FIG. 7 shows a preferred circuit implementation for 13-bit adder 204A, the specific circuit implementation can take any of various forms for effecting the operation of adding a 4-bit binary value to a 13-bit binary value.

13-Bit Register

The purpose and operation of 13-bit registers 208A and 208B are to input 13-bit sum lines 220A and 220B and to output 13-bit total lines 216A and 216B, respectively, to arbitration circuit 142 and to provide the running total as feedback to 13-bit adders 204A and 204B, respectively. In addition, 13-bit registers 208A and 208B may be used to facilitate testing of reference selector chip 48A as shall be described more fully below.

FIG. 8 is a detailed illustration of 13-bit register 208A. Since 13-bit register 208B is constructed the same way, details of that register shall be omitted. As shown in FIG. 8, 13-bit register 208A receives as input 13-bit sum line 220A, a thirteen bit test input (TIN) line 228, TRG input 122, TCLKA input 118, and reset line 174. 13-bit register 208A comprises thirteen register sections 232A, one for each data line in 13-bit sum line 220A. Each register section 232A comprises a bit multiplexer 236A and a bit register flip flop 240A.

Each bit multiplexer 236A receives as input one of the data lines from 13-bit sum line 220A, one of the TIN lines 228, and TRG input 122 (through an inverter 123). TIN line 228 allows the chip tester to input test values to 13-bit register 208A. As shown in FIG. 4, the lower order 8 bits of TIN line 228 comprise the respective 8 bits from candidate reference scan line (I−2) input 80B, and the higher order 5 bits of TIN line 228 comprise the 5 lower order bits from candidate reference scan line (I−1) input 80A. TRG input 122 is for selecting between 13-bit sum line 220A and TIN line 228 and for causing bit multiplexer 236A to output the selected input to bit register flip flop 240A.

Bit register flip flop 240A is a standard D-type flip flop which receives as input the output from bit multiplexer 236A. Bit register flip flop 240A is clocked by TCLKA 118 (through an inverter 119) after each byte of image data is input to the system and is reset by reset line 174 (through an inverter 175) during initialization of the system and whenever a new line is to be processed. The Q* output of bit register flip flop 240A is communicated through an inverter 244A and appears as one of the lines in 13-bit total line 216A.

Arbitration Circuit

The purpose and operation of arbitration circuit 142 in each reference selector chip is to compare the values in 13-bit registers 208A and 208B with the values in all the other 13-bit registers in reference line selector 16 and to determine which candidate reference scan line has the least number of bits dissimilar to the Ith coding line. Arbitration circuit 142 then controls the output of the selected reference scan line when processing the (I+1)th coding line.

As shown in FIG. 4, arbitration circuit 142 comprises an arbitrator 250, an arbitrator flip flop 254A, and an arbitrator flip flop 254B. Arbitrator 250 has as input 13-bit total lines 216A and 216B and ADIN 60. Arbitrator 250 outputs a winning signal through an A-WON line 264 and a B-WON line 266 to arbitrator flip flops 254A and 254B, respectively, to indicate which candidate reference scan line (from inputs 80A and 80B, respectively) had the least number of bits dissimilar to corresponding bits in the coding line 76. ADOUT 68 provides a signal whenever a signal is received on ADIN 60 or whenever reference selector chip 48A contains the selected reference scan line. EOUT 72 provides a signal whenever the selected reference scan line was input to reference scan line input 80B for communicating to reference selector chip 48B that the selected reference scan line will be input to reference scan line input 80C of that chip when processing the next coding line.

The structure of arbitrator 250 which allows it to perform the functions discussed in the overview may be better understood by referring to FIG. 9. As shown in FIG. 9, arbitrator 250 has as input 13-bit total line 216A, 13-bit total line 216B, an arbitration bus input (ABIN) line 258 for receiving signals from arbitration (ARB) line 58, and ADIN 60. Arbitrator 250 has as output an arbitration bus output (ABOUT) line 260 for communicating signals to arbitration (ARB) line 58, ADOUT 68, A-WON line 264, and B-WON line 266. A-WON line 264 is asserted whenever candidate reference scan line (I−1) has the least number of bits dissimilar to the coding line, and B-WON line 266 is asserted whenever candidate reference scan line (I−2) has the least number of bits dissimilar to the coding line.

Bit 12 of 13-bit total lines 216A and 216B, respectively, are input to a NAND gate 272. The output of NAND gate 272 is in turn connected to an inverter 274, and the output of inverter 274 appears as bit 12 of ABOUT line 260. Bit 12 of 13-bit total line 216A also is input to exclusive OR gate 278A, and bit 12 of 13-bit total line 216B also is applied to exclusive OR gate 278B. Bit 12 of ABIN line 258 is input to both exclusive OR gates 278A and 278B. The output of exclusive OR gates 278A and 278B (designated AM(12) and BM(12), respectively) function as mediation signals and are input to a mediation circuit 282 which comprises twelve mediation stages 284(i), i=0 through eleven; one for each remaining bit in ABIN line 258.

In general, each mediation stage 284(i) has as input the mediation signal AM(i+1) for the (i+1) TH bit of 13-bit total line 216A and the mediation signal BM(i+1) for the (i+1) TH bit of the 13-bit total line 216B. Each mediation stage 284(i) has as further input the ith bit of 13-bit total line 216A, the ith bit of 13-bit total line 216B and the ith bit of ABIN line 258. Each mediation stage 284(i) has as output the mediation signal AM(i) for the ith bit of the 13-bit total line 216A and the mediation signal BM(i) for the ith bit of 13-bit total line 216B. Additionally, each mediation stage 284(i) outputs the ith bit for ABOUT line 260.

Each mediation stage 284(i) comprises an arbitration bus driver circuit 288 and a mediator signal circuit 292. Bus driver circuit 288 comprises NOR gates 296A, 296B, and 298. NOR gate 296A receives as input the AM(i+1) signal from mediation stage 284(i+1) and the ith bit from 13-bit total line 216A. NOR gate 296B receives as input the BM(i+1) signal from the mediation stage 284(i+1) and the ith bit from 13-bit total line 216B. NOR gate 298 receives as input the output from NOR gates 296A and 296B and produces as output the ith bit for ABOUT line 260.

Mediator signal circuit 292 comprises exclusive OR gates 302A and 302B, NOR gates 304A and 304B, and inverters 305A and 305B. Exclusive OR gate 302A receives as input the ith bit from 13-bit total line 216A and ABIN line 258. Exclusive OR gate 302B receives as input the ith bit from 13-bit total line 216B and ABIN line 258. NOR gate 304A receives the AM(i+1) signal from the preceding mediator stage 284(i+1) and the output from exclusive OR gate 302A. NOR gate 304B receives the BM(i+1) signal from mediator stage 284(i+1) and the output from exclusive OR gate 302B. Inverter 305A receives as input the output from NOR gate 304A and produces as its output the AM(i) signal for this stage. Similarly, inverter 305B receives as input the output from NOR gate 304B and produces as its output the BM(i) signal for this stage.

As discussed in the overview, arbitration progresses in a bit-wise fashion wherein the binary values appearing on 13-bit total lines 216A and 216B are compared beginning at the highest order bit and proceeding toward the low order bits. For example, the highest order bit (bit 12) is compared among all 13-bit total lines in the system by using arbitration bus 52. Any 13-bit total line which has a zero in the twelfth bit position will be allowed to drive the bus low. Thus, when all the other 13-bit total lines in the system check bit twelve of ABIN line 258, they must have a zero in their bit 12 position or else they know that they do not have the lowest binary value. Any 13-bit total line 216 which has a one in bit 12 drops out of the arbitration process, and arbitration then continues among the remaining 13-bit total lines for bit positions twelve through zero.

The mediation signals on AM(i+1) and BM(i+1) determine whether 13-bit total lines 216A and 216B, respectively, may continue participating in arbitration. A zero on AM(i+1) or BM(i+1) enables its corresponding thirteen bit total line to arbitrate for the ith bit. A one on AM(i+1) or BM(i+1) is propagated through all lower i values and inhibits its corresponding thirteen bit total line from arbitrating for the ith and all lower bits. Thus, a one on AM(i+1) or BM(i+1) indicates that 13-bit register 208A or 208B, respectively, lost the arbitration.

Arbitration for bit 12 of 13-bit total lines 216A and 216B is accomplished by NAND gate 272. In order for a zero to be output on ABOUT line 260, either bit 12 of 13-bit total line 216A or bit 12 of 13-bit total line 216B must be a zero. NAND gate 282 outputs a one only when this set of circumstances exists. The one appearing at the output of NAND gate 272 is then inverted by inverter 274 and appears as a zero on ABOUT line 260.

Mediation signals AM(12) and B(12) are controlled by exclusive OR gates 278A and 278B. If bit 12 of ABIN line 258 is zero, then exclusive OR gate 278A will produce a zero output only if bit 12 of 13-bit total line 216A is also zero. Likewise, exclusive OR gate 278B will only produce a zero output only if bit 12 of 13-bit total line 216B is also zero.

The decision whether or not to drop out of the arbitration process for bits eleven through zero is made by mediator signal circuit 292. Each line in 13-bit total lines 216A and 216B has the ability to drive a zero onto arbitration bus 52 through ABOUT line 260. However, the AM(i+1) and BM(i+1) signals determine whether or not the signals appearing on each 13-bit total line is enabled to appear on ABOUT line 260. Once an AM(i+1) or BM(i+1) line contains a one, then every AM(i) or BM(i) line will contain a one. AM(i+1) and BM(i+1) insure propagation of a one at AM(i) or BM(i) by inputting a one to NOR gate 304A or NOR gate 304B respectively. The one input forces a zero output from the corresponding NOR gate 304A or 304B and a one output from inverter 305A or 305B.

When 13-bit total line 216A is enabled to arbitrate, the ith bit of lines 216A is exclusive ORed with the ith bit of ABIN line 258 by exclusive OR gate 302A for determining whether the ith bit of line 216A is "tied" with the ith bit of ABIN line 258. Similarly, when 13-bit total line 216B is enabled to arbitrate, the ith bit of line 216B is exclusive ORed with the ith bit of line 216B by exclusive OR gate 302B for determining whether the ith bit of line 216B is "tied" with the ith bit of ABIN line 258. When the ith bit of either line 216A or 216B is tied with the ith bit of ABIN line 258, then a corresponding zero appears at the output of exclusive OR gate 302A or 302B respectively. The outputs of gates 302A and 302B are applied to the inputs of NOR gates 304A and 304B and, if the corresponding AM(i+1) or BM(i+1) is zero, a "one" occurs at the outputs of NOR gate 304A or 304B and appears as a zero on AM(i) or BM(i) after passing through inverter 305A or 305B.

The thirteen AM(i) lines are input to NOR gates 308A, and the thirteen BM(i) lines are input to NOR gates 308B. The output of NOR gates 308A are input to NAND gate 310A, and the outputs of NOR gates 308B are input to NAND gate 310B. Since the binary value represented by a 13-bit total line, e.g.. 216A, will win the arbitration only if each bit is tied with the corresponding ABIN line 258 bit, and since each tie results in AM(i) being zero, a winning value will be represented by AM(i)=0 for I=0 to 12. When this is the case, every input to NOR gate 308A will be zero and every output of NOR gate 308A will be a "one." This produces a zero at the output of NAND gate 310A. Similarly, a winning binary value for 13-bit total line 216B results in BM(i)=0 for I=0 to 12. This results in all zeros at the input of NOR gates 308B, all ones at the outputs of NOR gates 308B, and a zero at the output of NAND gate 310B.

The signal appearing at ADOUT 68 is determined by a NAND gate 312. NAND gate 312 has as its inputs the outputs from NAND gates 310A and 310B and the output from an inverter 318. Inverter 318 inverts the signal on ADIN 60. Accordingly, ADOUT 68 will be a one whenever there is a zero input to NAND gate 312. That is, when ADIN line 60 is a one (and forced low by inverter 318), or when zero appears at the output of either NAND gate 310A or 310B (which correspond to a winning binary value in either 13-bit total line 216A and 216B, respectively).

The signal appearing at A-WON line 266 is determined by NOR gate 316. NOR gate 316 has as its inputs the output from NAND gate 310A and the signal on ADIN 60. Therefore, the signal appearing at A-WON line 266 will be one only if the inputs to NOR gate 316 are both zero, i.e., the output from NAND gate 310A is zero (indicating that 13-bit total line 216A won the arbitration) and ADIN 60 is zero (meaning that no previous reference selector chip in the chain also has a winning 13-bit total line. Of course, ADIN 60 will always be zero for reference selector chip 48A).

The signal appearing at B-WON line 264 is determined by NOR gate 314. NOR gate 314 has as its inputs the output of an inverter 320 which inverts the signal appearing at the output of NAND gate 310A the output from NAND gate 310B, and the signal on ADIN 60. The signal on B-WON line 264 will be one only if all inputs to NOR gate 314 are zero. i.e., the output from NAND gate 310A is one (and forced zero by inverter 320), the output from NAND gate 310B is zero (indicating that 13-bit total line 216B won the arbitration) and the signal on ADIN 60 is zero.

For the case where both 13-bit total lines 216A and 216B contain the lowest binary values, zeros will appear at both outputs of NAND gates 310A and 310B respectively. The zero output appearing at the output of NAND gate 310A is inverted by inverter 320 and appears as a one at the input of NOR gate 314. This forces the output of NOR gate 314, and hence B-WON line 264, to zero. Accordingly, inverter 320 establishes a priority between 13-bit registers 208A and 208B, so when 13-bit total lines 216A and 216B both have the lowest value, line 216A always wins out over line 216B.

Referring back to FIG. 4, A-WON line 264 and B-WON line 266 are connected as inputs to D-type arbitration flip flops 254A and 254B respectively. Arbitration flip flops 254A and 254B are clocked by an arbitration clockline 322 and reset by reset line 104. Arbitrator flip flop 254B has as its output EOUT 72 for informing reference selector chip 48B that reference scan line input 80C in that chip will contain the selected reference line during the next cycle. Arbitrator flip flop 254A has its output 324 connected as an input to reference line output circuit 146.

Reference Line Output Circuit

The purpose and operation of reference line output circuit 146 is to output the selected reference scan line for the Ith coding line while reference selector 16 is processing the (I+1)th coding line.

As shown in FIG. 4, reference line output circuit 146 has as its inputs data latch lines 178A and 178C, EIN 64 and output 324 of arbitration flip flop 254B. Reference line output circuit 146 communicates the selected reference scan line to selector-compressor bus 44 through a reference output circuit 328 comprising eight reference output stages 332.

Flip Flop output 324 is connected to a NAND gate 336 and to an inverter 340. Inverter 340 has as its output a B-enable line 344. EIN 64 is connected to an inverter 348 which in turn is connected to NAND gate 336 and an inverter 352. Inverter 352 has as its output an A-enable line 356. The output of NAND gate 336 is in turn connected to an inverter 316 which has as its output an output enable line 364.

Each reference output stage 332 has as its input one of the eight data lines from each of data latch line 178A and 178C, B-enable line 344. A-enable line 356, and output enable line 364. Data latch line 178C and B-enable line 344 are input to a NAND gate 368, and data latch line 178A and A-enable line 356 are input to a NAND gate 372. The outputs of NAND gates 368 and 372 are input to a NAND gate 376. The output of NAND gate 376 is input to an output buffer 380 which also has as its input output enable line 364. Output enable line 364 is for enabling the operation of output buffer 380. The outputs from output buffer 380 comprise reference output (REFOUT) line 59.

Whether a reference selector chip is allowed to place data on selector-compressor bus 44 is determined by NAND gate 336 and output buffer 380. Any zero signal input to NAND gate 336 results in a one input to inverter 360, and consequently a zero signal appears on output enable line 364 for enabling output buffer 380. If EIN 64 is one, indicating that the selected reference line was shifted into the chip, then inverter 348 will produce a zero input to NAND gate 336. Similarly a zero signal on output line 324 indicates that the selected reference line was resident in the chip during the Ith selection process and will continue to reside in the chip during the (I+1)th selection process. When a reference selector chip does not contain the selected reference line (either because it was never there or it was shifted to the succeeding chip), both inputs to NAND gate 336 are one which produces a corresponding one output from inverter 360 on output enable line 364 for inhibiting operation of output buffer 380.

NAND gates 368, 372 and 376 determine whether data latch line 178A or 178C will be allowed to drive output buffer 380. When a one signal appears on EIN 64, a corresponding one signal is input to NAND gate 372 on A-enable line 356. The one input to NAND gate 372 causes NAND gate 372 to function like an inverter so that the complement of the signal on data latch line 178A appears at the output of NAND gate 372. When EIN 64 is zero, the corresponding zero input to NAND gate 372 through A-enable line 356 insures that the output of NAND gate 372 is always one.

Similarly, when a zero signal appears on flip flop output 324, the signal is inverted by inverter 340 and appears as a one input to NAND gate 368 through B-enable line 344. This one signal causes NAND gate 368 to function like an inverter for the signal appearing on data latch line 178C. When flip flop output 324 is one, the corresponding zero input to NAND gate 368 through B-enable line 344 insures that the output of NAND gate 368 will always be one.

Since only one candidate reference scan line is ever selected, one of the outputs of NAND gates 368 or 372 will always be a one, and the one input to NAND gate 376 causes NAND gate 376 to function as an inverter. Therefore, the output from either NAND gate 368 or 372, whichever is active as the output gate, will be inverted and hence mirror the original input from data latch line 178C or 178A, respectively. The output of NAND gate 376 then passes through output buffer 380 and appears as reference line (REFOUT) output 59.

Line Control Circuit

The purpose and operation of line control circuit 150 is to initiate arbitration after the last byte of each input scan line has been processed, to inform CPU 24 when arbitration is complete, and to clear the appropriate registers for processing the next coding line. As shown in FIG. 4, line control circuit 150 comprises a line control module 390 which has as its inputs system clock 100, NEWLIN 102 and reset 104. Line control module 390 has as its outputs ready signal 126 for informing CPU 24 that the reference selector chip is ready to process a new coding line, reset line 174 for clearing input registers 162A–162C and 13-bit registers 208A and 208B, and arbitration clock line 322 for clocking arbitration flip flops 254A and 254B during arbitration. Reset input 104 is also directly connected to arbitration flip flops 254A and 254B for clearing them when a new line is to be processed.

FIG. 10 is a schematic circuit drawing for the line control module 390 preferably included in each reference selector chip. Although FIG. 10 shows a preferred circuit implementation for line control module 390, the specific circuit implementation can take any of various forms for effecting the control functions noted above.

Test Circuit

Test circuit 154 is for aiding the applications designer when testing the chip. In particular, test circuit 154 allows the applications designer to selectively input to 13-bit registers 208A or 208B either the calculated sums appearing on 13-bit sum lines 220A or 220B, respectively, or the test input appearing on TIN line 228. Test circuit 154 also allows the applications designer to selectively drive arbitration bus 52, through arbitration line 58, using the values from either arbitrator 250, 13-bit adders 204A or 204B, or comparison counters 200A or 200B.

As shown in FIG. 4, test circuit 154 has as its inputs READ input 116, TCLKA input 118, TCLKB input 120, TRG input 122, and a 2-bit SEL input 124.

SEL input 124 determines which values shall be used for driving arbitration bus 52. TCLKA input 118 and TCLKB 120 are coupled with read input 116 through NAND gates 510 and 512, respectively. TCLKA input 118 and TCLKB input 120 function as enable signals for NAND gates 510 and 512, respectively. For example, when TCLKA input 118 is zero, the output of NAND gate 510 is forced to a one. When TCLKA input 118 is one, then NAND gate 510 functions as an inverter for read input 116, and the output of NAND gate 510 clocks the value appearing on TIN line 228 into 13-bit registers 208A when TRG input 122 is high. Refer to the description of 13-bit registers 208A and 208B for more detail.

Test circuit 154 has as its major component a test input multiplexer 500 for selecting among data on four-bit sum lines 212A and 212B, 13-bit sum lines 220A and 220B, and arbitration bus output line 260. Test input multiplexer 500 then directs the selected data to arbitration bus 52 through a selected arbitration data output line 504.

FIGS. 11 and 12 illustrate the detailed construction of test input multiplexer 500.

As shown in FIG. 11, test input multiplexer 500 includes a four-way selector circuit 512, comprising thirteen four-way selector stages 514, and a four-way switch 516 for indicating to four-way selector circuit 512 which of the four possible input sources shall be communicated to selected arbitration data output line 504.

Each four-way selector stage 514 comprises a NAND gate 20 having as its inputs a selection zero line 522 and one of the lines from a comparison counter test line 524. In this embodiment, bits 0–3 of comparison counter test line 524 are selected from four-bit sum line 212B, bits 4–7 of comparison counter test line 524 are selected from four-bit sum line 212A, and bits 8–12 of comparison counter test line 524 are connected to the system voltage.

Each four-way selector stage 514 further comprises a NAND gate 528 having as its inputs a selection one line 530 and one of the lines from 13-bit sum line 220A; a NAND gate 534 having as its inputs a selection two line 536 and one of the lines from 13-bit sum line 220B; and a NAND gate 540 having as its inputs a selection three line 542 and one of the lines from arbitration bus output line 260. The outputs of NAND gates 520, 528, 534 and 540 are input to a NAND gate 546 whose output comprises selected arbitration data output line 504.

FIG. 12 illustrates the detailed construction of four-way switch 516. As shown in FIG. 12, four-way switch 516 comprises NAND gates 546 548, 550 and 552 whose outputs are coupled to the inputs of inverters 554, 556, 558 and 560, respectively, to produce selection zero line 522, selection one line 530, selection two line 536, and selection three line 542, respectively. SEL input 124 is a 2-bit binary value line comprising selection lines 124A and 124B. Selection line 124A is input to NAND gates 546 and 548 and an inverter 564. The output from inverter 564 is input to NAND gates 550 and 552. Selector line 124B is input to NAND gates 546 and 550 and an inverter 556. The output from inverter 566 is input to NAND gates 548 and 552.

In operation, a 2-bit binary value is input on SEL input 124, and that value determines which selection line 522, 530, 536 or 542 shall be active. A selection line is active when a "one" appears at its output. For example if selection line 124A is a zero, and selection line 124B is a one, NAND gates 546, 548 and 552 will each produce a one output which appears as a zero output on selection lines 522, 530 and 542. However, NAND gate 550 has both its inputs one which causes a zero output which in turn appears as a one on selection 3 line 536.

Referring back to FIG. 11, the one appearing on selection 3 input 536 is input to NAND gate 534 and causes NAND gate 534 to function as an inverter to the signal input from 13-bit sum line 220B. The zeros appearing on selection zero line 522, selection one line 530, and selection three line 542 forces ones at the corresponding outputs of NAND gates 520, 528 and 540 respectively. The ones appearing at the outputs of these gates are input to NAND gate 546 and cause NAND gate 546 to function as an inverter to the selected NAND gate 534. Accordingly, the inverted signal appearing at the output of NAND gate 534 is inverted again by NAND gate 546 for communicating the original 13-bit sum line 220B signal to selected arbitration data output line 504.

While the above is a complete description of a preferred embodiment of the present invention, various modifications may be employed. For example, all five reference selector chips may be combined into a single chip, various test inputs may be substituted for TIN line 228, or the number of candidate reference scan lines input to each chip may be increased or decreased as desired. Consequently, the description should not be used to limit the scope of the invention which is properly set out in the claims.

What is claimed is:

1. In an image processing system wherein an image is represented by a series of image scan lines, each image scan line in turn being represented by a series of bits, and wherein an image scan line is communicated from one image processing element to another image processing element by encoding the image scan line in a compressor using a reference image scan line, an apparatus for selecting a reference image scan line from a plurality of candidate reference image scan lines comprising:

means for receiving a plurality of candidate reference image scan lines;

means for receiving an image scan line to be encoded;

means for simultaneously comparing the bits from the image scan line to be encoded with corresponding bits from a plurality of candidate reference image scan lines;

means, connected to the comparing means, for counting the number of bits in each candidate image scan line unequal to the corresponding bits in the image scan line to be encoded;

means, connected to the counting means, for determining which candidate reference image scan line has a least number of bits unequal to the corresponding bits in the image scan line to be encoded; and means, connected to the determining means, for indicating which candidate reference image scan line has a least number of bits unequal to the corresponding bits in the image scan line to be encoded.

2. The apparatus according to claim 1 further comprising:

means for establishing a unique priority for each candidate reference image scan line; and wherein the indicating means includes means, connected to the priority establishing means, for indicating the highest priority candidate reference image scan line having a least number of bits unequal to the corresponding bits in the image scan line to be encoded.

3. The apparatus according the claim 2 wherein the candidate reference image scan lines comprise the 10 image scan lines preceding the image scan to be encoded.

4. The apparatus according to claim 2 wherein the counting means includes a register associated with each candidate reference image scan line and having bit positions arranged from the highest order bit position to a lowest order bit position for storing a binary sum of the number of bits in each candidate image scan line unequal to the corresponding bits in the image scan line to be encoded.

5. The apparatus according to claim 4 wherein the indicating means includes means for indicating when a prescribed register corresponds to the highest priority candidate reference image scan line having a least number of bits unequal to the corresponding bits in the image scan to be encoded.

6. The apparatus according to claim 3 further comprising:

means for selectively placing a binary value into a bit position of each register.

7. The apparatus according to claim 4 wherein the determining means includes means for comparing a binary sum in each register.

8. The apparatus according to claim 7 wherein the binary sum comparing means includes means for sequentially comparing the binary value in successive bit positions of each register from the highest order but position to the lowest order bit position.

9. The apparatus according to claim 8 wherein the binary sum comparing means includes means for generating a losing signal for a selected register when the binary value in a compared bit position of that register is greater than the binary value in a compared bit position of another register.

10. The apparatus according to claim 9 wherein the indicating means includes means for generating a winning signal when the binary value in the lowest order bit position of a register is not greater than the lowest order bit position of another register and no losing signal was generated for that register.

11. The apparatus according to claim 10 further comprising means, connected to the image scan line receiving means, to the candidate reference image scan line receiving means, and to the indicating means for communicating to the compressor the image scan line to be encoded and the candidate reference image scan line corresponding to the register for which a winning signal is generated.

12. The apparatus according to claim 9 wherein the losing signal generating means generates the losing signal for the selected register for each successive bit position comparison after the losing signal is initially generated for that register.

13. The apparatus according to claim 1 further comprising means, connected to the image scan line receiving means, to the candidate reference image scan line receiving means, and to the indicating means, for outputting both the image scan line to be encoded and a candidate reference image scan line having a least number of bits unequal to the corresponding bits in the image scan line to be encoded.

14. In an image processing system wherein an image is represented by a series of image scan lines, each image scan line in turn being represented by a series of bits, and wherein an image scan line is communicated from one image processing element to another image processing element by encoding the image scan line in a compressor using a reference image scan line, a method of selecting a reference image scan line from a plurality of candidate reference image scan lines comprising the steps of:

simultaneously comparing the bits from the image scan line to be encoded with corresponding bits from a plurality of candidate reference image scan lines;

counting the number of bits in each candidate reference image scan line unequal to the corresponding bits in the image scan line to be encoded;

determining which candidate reference image scan line has a least number of bits unequal to the corresponding bits in the image scan line to be encoded; and indicating which candidate reference image scan line has a least number of bits unequal to the corresponding bits in the image scan line to be encoded.

15. The method according to claim 14 further comprising the steps of:
establishing a unique priority for each candidate reference image scan line; and
indicating the highest priority candidate image scan line having a least number of bits unequal to the corresponding bits in the image scan line to be encoded.

16. The method according to claim 15 further comprising the step of indicating when a prescribed register corresponds to the highest priority candidate reference image scan line having a least number of bits unequal to the corresponding bits in the image scan line to be encoded.

17. The method according to claim 16 further comprising the step of selectively placing a binary value into a bit position of each register.

18. The method according to claim 16 further comprising the step of comparing a binary sum in each register.

19. The method according to claim 18 further comprising the step of comparing a binary value in successive bit positions of each register from the highest order bit position to the lowest order bit position.

20. The method according to claim 19 further comprising the step of generating a losing signal for a selected register when the binary value in a compound bit position of that register is greater than the binary value in a compared bit position of another register.

21. The method according to claim 20 further comprising the step of generating a winning signal when the binary value in the lowest order bit position of a register is not greater than the lowest order bit position of another register and no losing signal was generated for that register.

22. The method according to claim 21 further comprising communicating to the compressor the image scan line to be encoded and the candidate reference image scan line corresponding to the register of which a winning signal is generated.

23. The method according to claim 20 further comprising the step of generating the losing signal for the selected register for each successive bit position comparison after the losing signal is initially generated for that register.

24. The method according to claim 14 further comprising the step of outputting both the image scan line to be encoded and a candidate reference image scan line having a least number of bits unequal to the corresponding bits in the image scan line to be encoded.

* * * * *

UNITED STATES PATENT AND TRADEMARK OFFICE
CERTIFICATE OF CORRECTION

PATENT NO. : 4,837,848

DATED : June 6, 1989

INVENTOR(S) : Alex E. Henderson, Frederick L. Drain, Lawrence G. Roberts

It is certified that error appears in the above-identified patent and that said Letters Patent is hereby corrected as shown below:

Col. 2, line 45, insert --adder-- after "13-bit".
Col. 8, line 34, delete "Or" and insert --OR--.
Col. 12, line 14, delete "B(12)" and insert --BM(12)--.

In the Claims:

Col. 17, line 68, insert --line-- after "scan".
Col. 18, line 11, delete "but" and insert --bit--.
Col. 20, line 3, delete "compound" and insert --compared--.

Signed and Sealed this

Twenty-fifth Day of December, 1990

Attest:

HARRY F. MANBECK, JR.

Attesting Officer

Commissioner of Patents and Trademarks